Dec. 29, 1942.  A. C. STALEY ET AL  2,306,796
HEATER
Filed Oct. 7, 1939  4 Sheets-Sheet 1

INVENTORS
ALLEN C. STALEY
GEORGE L. McCAIN AND
WINTHROP S. HORTON.
BY
ATTORNEYS.

Dec. 29, 1942. A. C. STALEY ET AL 2,306,796
HEATER
Filed Oct. 7, 1939   4 Sheets-Sheet 2

INVENTORS
ALLEN C. STALEY
GEORGE L. McCAIN AND
BY WINTHROP S. HORTON.

ATTORNEYS.

Dec. 29, 1942.  A. C. STALEY ET AL  2,306,796
HEATER
Filed Oct. 7, 1939  4 Sheets-Sheet 4

INVENTORS
ALLEN C. STALEY
GEORGE L. McCAIN AND
WINTHROP S. HORTON.
BY Harness, Lind, Pates & Harris
ATTORNEYS.

Patented Dec. 29, 1942

2,306,796

UNITED STATES PATENT OFFICE 2,306,796

HEATER

Allen C. Staley, Birmingham, George L. McCain, Detroit, and Winthrop S. Horton, Birmingham, Mich., assignors to Chrysler Corporation, Highland Park, Mich., a corporation of Delaware Application October 7, 1939, Serial No. 298,370

3 Claims. (Cl. 98—2)

Modern automotive passenger vehicles may be equipped with a variety of air heating devices, principally devices which circulate air taken from within the body of the car through a heating coil by means of a motor-driven blower, but it is not always recognized that the occupants of the vehicle should be protected from noxious fumes which might leak into the body of the vehicle by providing a constant inflow of fresh air, which should be of sufficient quantity to maintain the percentage of noxious fumes below a harmful amount. Accordingly, it is an aim of the present invention to provide means whereby an automobile heating device may be supplied with a quantity of clean, fresh air sufficient to prevent the accumulation of dangerous gases, such fresh air to be cleaned by the apparatus and, in wet weather, separated from drops of water which might be admitted to the system.

An object of the present invention is to provide an air filtering and heating distribution system which may handle air taken entirely from the interior of the automobile, or air taken entirely from outside the automobile, or a proportion of both fresh air and recirculated air, at the will of the operator.

A further object of the present invention is to provide air conditioning means of the type previously described which may be supplied either as a part of the automobile when manufactured, or may be supplied as an accessory to be applied by the owner of the automobile, or by the dealer at the request of the prospective owner, without in any way modifying the character or detracting from the appearance either of the automobile or of the heating and air distributing mechanism.

A further object of the present invention is to provide automobile heating means having sufficient capacity and of such character as to be readily adapted to supply heated air to defrosting outlets positioned beneath and inside of the windshield of the automobile in order that heated air may be directed across the windshield so as to prevent the accumulation of moisture and frost thereon.

A further object of the present invention is so to form air heating means of the character described as to be adaptable for a plurality of arrangements. In other words, the present invention may be supplied as a whole, or in any part, so that a standard automobile may comprise ventilating means for admitting fresh air to the interior of the automobile without heating thereof, or the standard automobile may be provided with the ventilating means and one heater either with or without defrosting means attached thereto, or the standard automobile may comprise any of the foregoing combinations with another heater associated therewith for greater distribution of heated and fresh air, as desired. The various parts of the present invention are so designed that any one part or several parts may be omitted from the standard automobile and may be purchased as standard accessories by the owner of the automobile.

A further object of the present invention is to provide a system whereby heated air is admitted to the body of the vehicle at a low level and in a stream directed toward the rear compartment so that the heated air may rise throughout the interior of the vehicle in both the front and rear compartments of the vehicle. In connection with this object of the present invention, the outlet for the heated air is so arranged as to project a wall or blanket of heated air adjacent the inner surfaces of the sides of the tonneau of the vehicle whereby the hottest air is positioned between the occupants of the vehicle and the exterior walls thereof. By such means radiation of body heat from the occupants to the exterior surfaces is materially lessened or prevented, so that a greater feeling of comfort may be achieved than heretofore possible.

In a conventional system wherein a blast of hot air is directed against the faces of the occupants of the vehicle, a great deal of discomfort is occasioned because the hot, and usually dry, air tends to dry the nasal membranes of the occupants and does not prevent radiation of heat from the occupants to the cold side walls of the vehicle, with the result that the occupants attempt to warm the portions of their bodies next to the side walls of the vehicles by increasing the temperature of the air within the vehicle while attempting to lessen nasal discomfort by opening windows for the admission of cold air adjacent their heads. At best, a poor compromise could be achieved by such a system; while the present invention is designed to distribute the hottest air between the bodies of the occupants of the vehicle and the side walls thereof, so that body radiation is materially lessened or wholly prevented and so that the air reaches the nasal passages of the occupants after having been tempered by mixture with cooler air within the body of the vehicle, and to force the air to flow to the nasal passages of the occupants from a rearward portion of the vehicle after having lost its initial velocity, so that the air breathed by the occupants is pleasantly comfortable and irritation occasioned by a steady flow of hot air at a high velocity across the eyeballs of the occupants is avoided.

A further object of the present invention is to provide means of the foregoing character which, while chiefly designed for the use of a heating medium to heat the air, could nevertheless be readily adapted for the use of a cooling medium to cool the air in hot weather, if the owner of the vehicle desires to provide means or chilling a cooling medium.

A further object of the present invention is to provide apparatus of the foregoing character which presents a pleasing appearance and which does not detract from the general appearance of the interior trim of the vehicle. Coincident with the foregoing, the present invention comprises an outlet duct which is adapted to be positioned between the inner surface of the cowl side wall and the kick-pad or interior trim fabric of the side wall of the cowl, so that the addition of the present invention to a vehicle does not materially alter the general appearance thereof.

The foregoing objects are achieved in a mechanism of sturdy construction which is easy to manufacture and easily assembled and maintained in operation.

Further objects and advantages of the present invention should be readily apparent from an inspection of the accompanying drawings taken in connection with the following specification wherein like numerals refer to like parts throughout.

In the drawings, Fig. 1 is a schematic representation of an automobile having the present invention applied thereto and showing a detail of the air distribution system;

Figure 1:
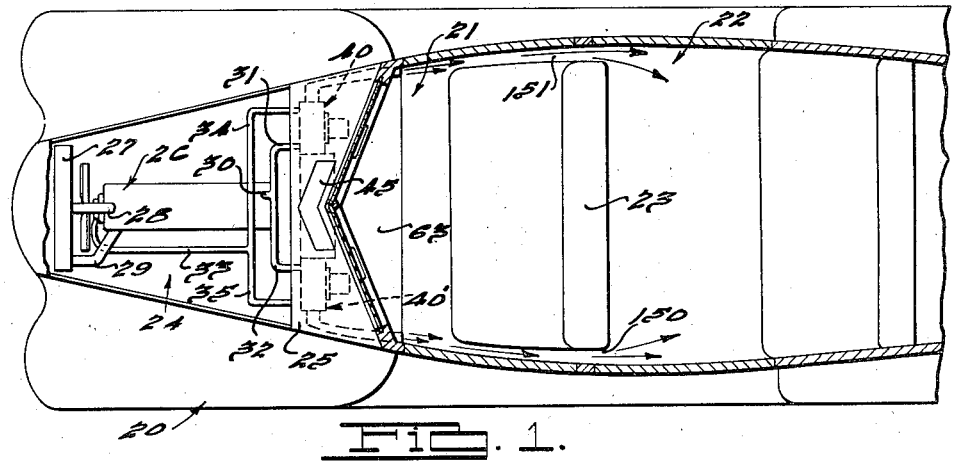
Figure 2:
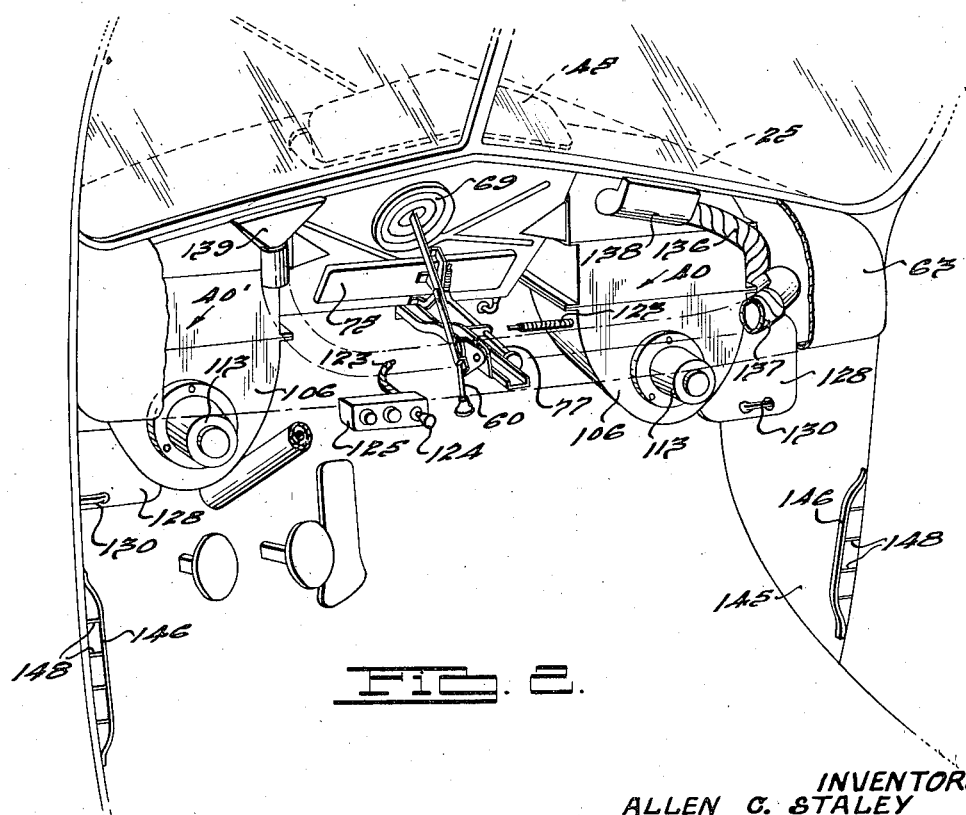
Fig. 2 is an isometric view of the driver's compartment of a vehicle, with certain parts broken away in order to show the application of the present invention thereto.

In Figs. 1 and 2, there is disclosed a vehicle 20 having a tonneau or body portion consisting of the driver's compartment 21 and the rear compartment 22, the compartments being separated by the front seat 23 in accordance with usual construction, and a motor compartment 24 which is separated from the tonneau by a cowl 25. The motor 26 is provided with a radiator 27 by means of which water used to cool the motor is in turn cooled by a stream of air flowing through the motor compartment. The water enters the motor block from the radiator through an inlet connection 28 and returns to the radiator through an outlet connection 29. Water which has been heated within the motor may be drawn off for use in the present invention through a supply conduit 30 which is provided with branches 31 and 32, the branch 31 leading through an opening in the right side of the front wall of the driver's compartment, and the branch 32 leading to a similar opening in the left side thereof. The branches 31 and 32 may be supplied as standard parts of the vehicle with plugs in the ends thereof to permit the ready application of heating means thereto, or a single pipe leading to the right or left side may be supplied as standard, with an elbow connection whereby the other branch may be applied thereto, or the motor block may be supplied with a plugged and tapped opening whereby a single right-hand or a single left-hand or a branched pipe may be attached thereto as desired. The heated water which flows therethrough passes through the heating element or elements of the present invention and returns to the engine block through a suitable conduit 33 having branches 34 and 35, which, as described with respect to the pipe 30 and its branches, may be supplied as standard or may have any of its parts supplied as standard equipment.

The heating medium is passed through the heating element of a blower and heater assembly 40 which is mounted against the front wall 41 of the driver's compartment beneath the cowl 25 if a right-hand mechanism is used, or it is passed through a similar assembly 40' if a left-hand assembly is used, or it may be passed through both assemblies 40 and 40'. Since both assemblies are, or may be, identical except for their reversed characteristics, it will suffice to describe one in detail.

In the standard automobile the top portion of the cowl 25 is provided with a ventilator 45 consisting of a plate which may rest upon a resilient sealing ring 46 mounted in flanges on an opening through the cowl. When the ventilator 45 is in raised position, as shown in Fig. 2, fresh air will be drawn into an intake compartment 47 extending across the intermediate portion of the driver's compartment immediately beneath the cowl 25. The intake compartment is defined by a front wall 48, an upper wall 49 provided with an opening registering with the opening in the cowl 25, and a rear wall 50 which slopes forward and downward so as to provide a rain trap, to the lowest portion of which is attached a drain 55 extending forwardly through the wall 41 and downwardly through some convenient outlet for the disposal of rain water which may be admitted through the ventilating opening. The edge of the opening in the upper wall 49 is formed into a trough 56 provided with an opening 57 at its lowermost central point, which opening permits water accumulating in the trough to drop into the rain trapping portion of the intake compartment 47.

Figure 3:
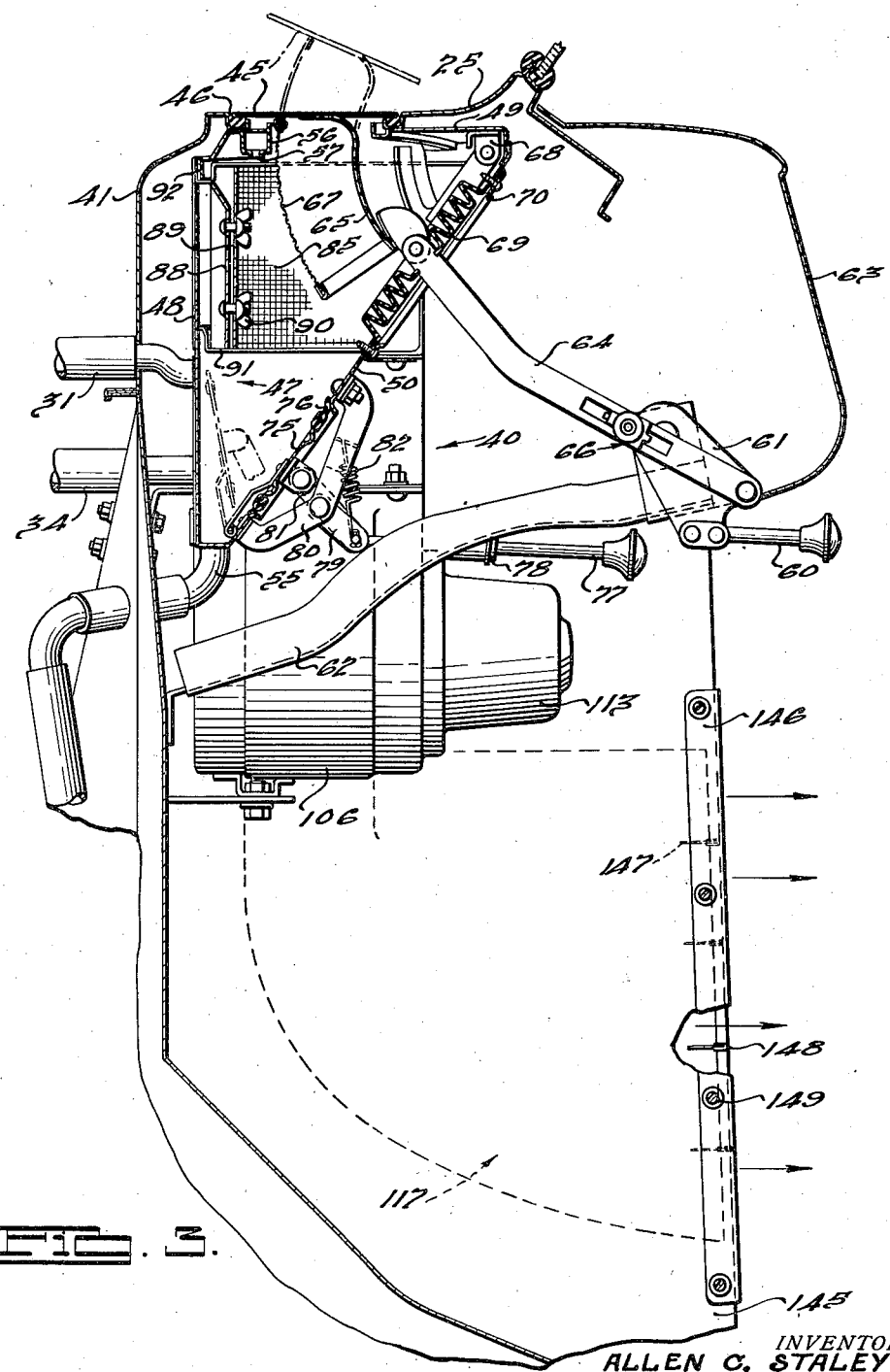
Fig. 3 is a vertical section through the driver's compartment of an automobile taken substantially at the center line thereof.

The ventilator 45 is opened so as to swing widest at its forward portion by mechanism comprising an operating handle 60 attached to an operating lever 61 pivotally mounted upon a bracket 62 extending into the driver's compartment from the front wall 41 to a point closely adjacent the lower edge of the instrument panel 63. The operating lever 61 is pivotally attached to a link 64 which is also pivotally attached to a bracket 65 fastened to the under surface of the ventilator 45. When the handle 60 is pushed forward and downward, the link 64 causes the ventilator to swing upward and rearward, as shown in Fig. 3. Preferably the link 64 is provided in two parts connected by an adjustable coupling device 66 of usual construction in order that the ventilator 45 may be caused to seat firmly against the resilient sealing ring 46 without rattling. The bracket 65 and the ventilator 45 preferably support a screen 67 which is arcuately shaped so as to permit the screen to be positioned across the open gap between the ventilator and the intake compartment at any position to which the ventilator is opened in order to prevent large objects and insects from being admitted to the interior of the automobile. The bracket 65 is pivotally attached to a support 68 mounted on the upper wall 49 of the intake compartment in order to control the pivotal movement thereof from "open" to "closed" position. In order that the operating link 64 may extend through an opening in the wall 50 of the intake compartment without permitting the escape therefrom of moisture and air, the forward extremity of the link extends through and is fastened to the central portion of a collapsible shroud 69 which is preferably formed, entirely or in part, of resilient material molded in the shape of a series of concentric corrugations and having its outer edge clamped to the edge of a circular opening in the wall 50 by a clamping ring 70. When the link 64 is forced forwardly and outwardly the resilient corrugations permit the shroud to extend within the intake compartment, and when the ventilator is closed the resilient corrugations cause the shroud 69 to return to its normal position, as shown in Fig. 3. Other flexible, substantially impervious materials may be used for the shroud 69, but it is preferred that the molded rubber shroud be used because of its neat appearance in collapsed and extended position.

The lower portion of the intake compartment 47 is provided with an opening normally closed by a door 75 which preferably comprises a rectangular metal plate having a resilient border member 76 attached thereto which contacts the edge of the opening to seal the same when the door is closed. The door 75 is adapted to be opened and closed by a push rod 77 which is pivotally and slidably mounted at 78 on a bracket extension of bracket 62. The forward end of rod 77 is pivotally attached to a link 79 pivoted to a bracket 80 mounted upon the wall 50 and a second link 81 pivotally attached to the door 75, and a tension spring 82 is extended from the point of attachment of rod 77 to the links to a stationary portion of bracket 80. Forward movement of rod 77 forces the door 75 inward, as shown in outline in Fig. 3, while rearward movement of rod 77 closes the door, the spring 82 applying tension to keep the door in either position.

Figure 5:
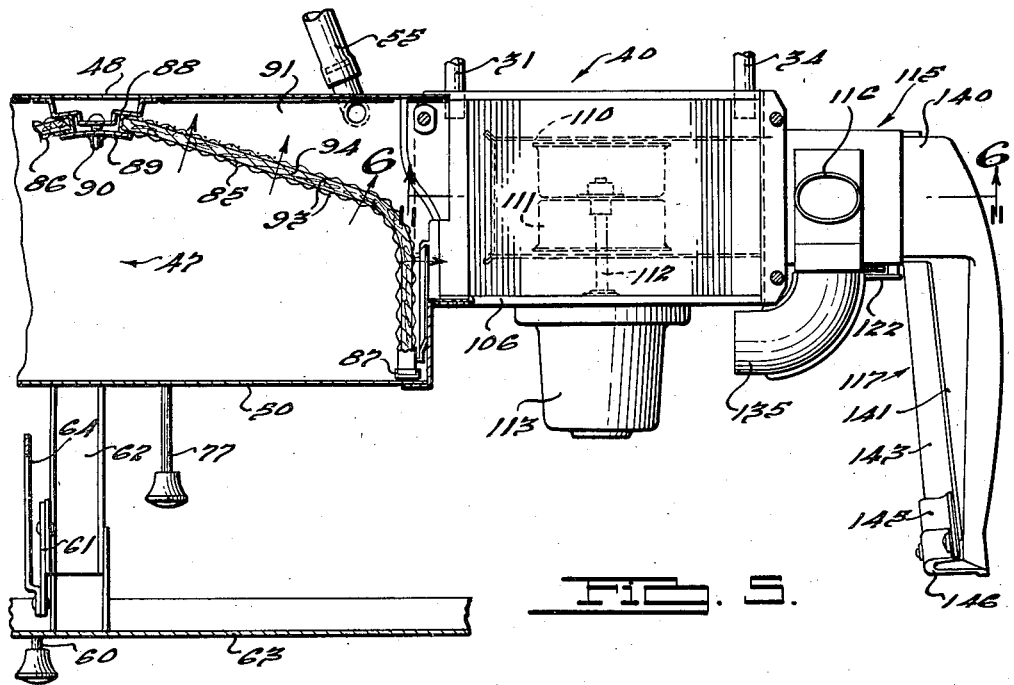
Fig. 5 is a plan view of the right side of the driver's compartment, with parts broken away to show details of the system.

As seen in Figs. 3 and 5, the air which is admitted to the interior of the intake compartment 47 may be drawn therefrom by the blower of the attached heating mechanism 40, or 40', or by both blowers. In order to filter the air and to separate drops of moisture therefrom there is provided a filter or filters 85 and 86, each of which is vertically mounted within the intake compartment 47 and extends from a point adjacent the center of the front wall 48 to a point adjacent the side edge of the rear wall 50, the filter being bent adjacent its intermediate portion in order to mount as long a filter as possible within the space provided. The filter is so supported as to be interposed between the ventilator opening and an opening in the side wall of the compartment 47, so that all air drawn therefrom must pass through the filter in order that dust and other foreign particles may be removed therefrom. The filter is conveniently mounted by positioning one end in a vertical bracket 87 adjacent the rear wall 50 and by clamping the opposite end between a vertical bracket 88 and a clamping strip 89 adapted to be drawn tight by wing nuts 90. The filter is of such height as to have its lower edge abut, or be supported by, a horizontal bracket 91 and its upper edge abut a horizontal bracket 92 so as to confine the air movement to the passages through the filter. The filter may be of any convenient construction, but preferably comprises outer layers of wire mesh 93 holding therebetween a filler 94 of fabric, or other material, which may be impregnated or coated with a viscous, tacky material adapted to retain dust, pollen, and other foreign particles coming in contact therewith. The clamping strip 89 may be removed in order to withdraw the filter when desired in order that it may be cleaned or replaced by a new filter. If only the right-hand heating mechanism is employed only the filter 85 need be supplied, the filter 86 being supplied when the left-hand heater is employed, and the outlet from the intake compartment 47 which is not in use may be closed by a removable plate (not shown).

The side wall of the intake compartment 47 beyond the filter 85 is provided with an opening, to the edges of which may be attached the end of an elbow duct 100, the outlet of which is turned downward and provided with a flange to which may be bolted the flange of a heat-transfer coil 101, a gasket or resilient ring 102 being interposed between the two flanges in order to lessen the transmission of noises and vibrations. The heat-transfer element 101 comprises a vertical inlet header 103 with which the inlet conduit 31 communicates and from which extend a plurality of horizontal tubes 104, the other ends of which extend into a vertical outlet header 105 from which the return conduit 34 extends. The horizontal tubes 104 are preferably provided with, or passed through and in contact with, a plurality of vertical fins of thin sheet metal whereby the heat transferring ability of the mechanism is increased. The air which passes between the vertical fins and about the surfaces of the tubes 104 passes vertically downward into a blower chamber 106 of artistic shape, the upper edge of which is flanged and attached to a flange on the lower surface of the coil 101, a gasket or vibration dampening member 107 being likewise provided to lessen noises and vibrations. The coil 101 is entirely enclosed by vertical walls, the enclosing walls forming a vertical conduit through which air may be drawn from the elbow duct 100 into the blower chamber 106.

Figure 4:
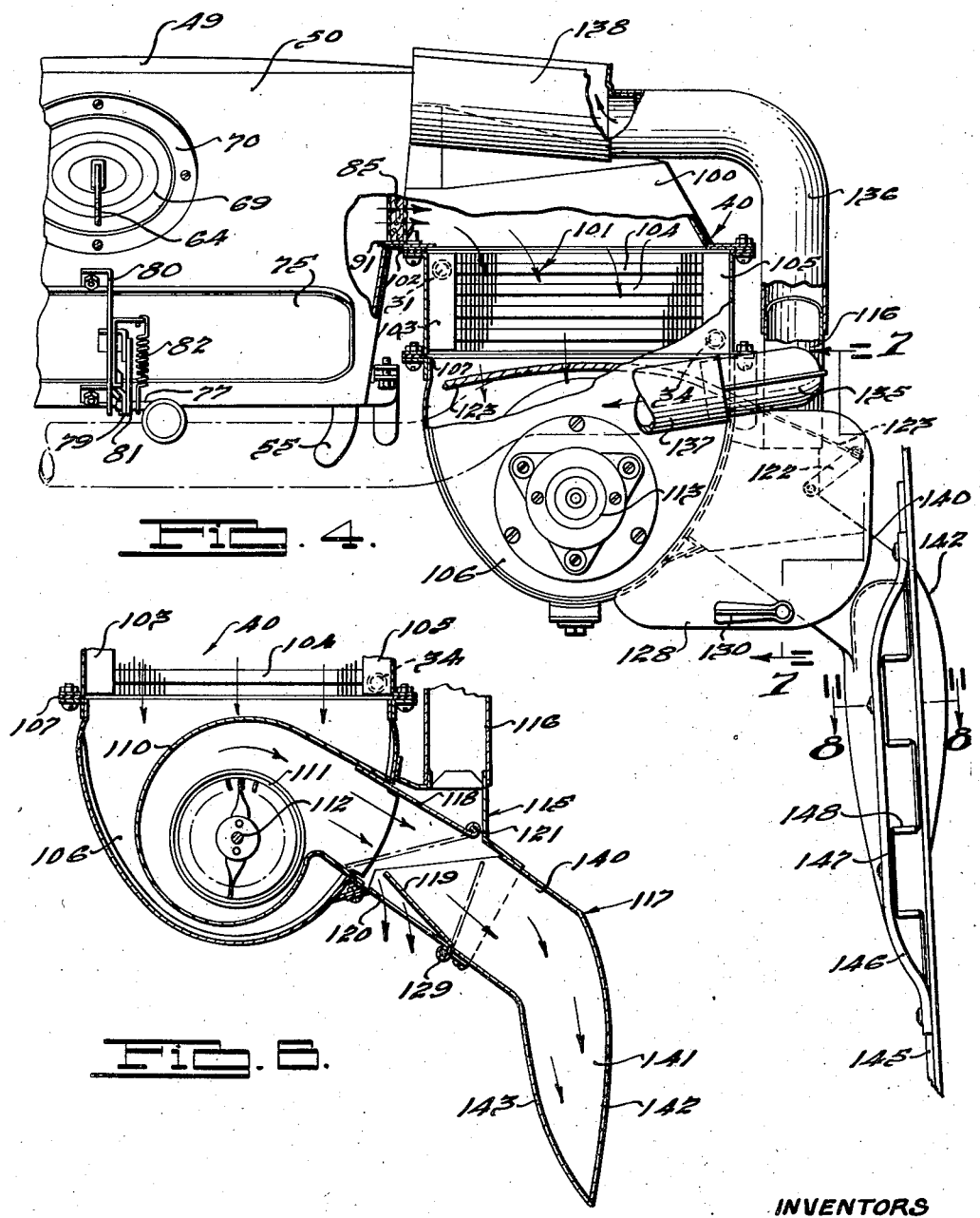
Fig. 4 is an elevation of the right side of the driver's compartment of an automobile having the present invention therein, with parts broken away to show details of the system.
Figures 6, 7:
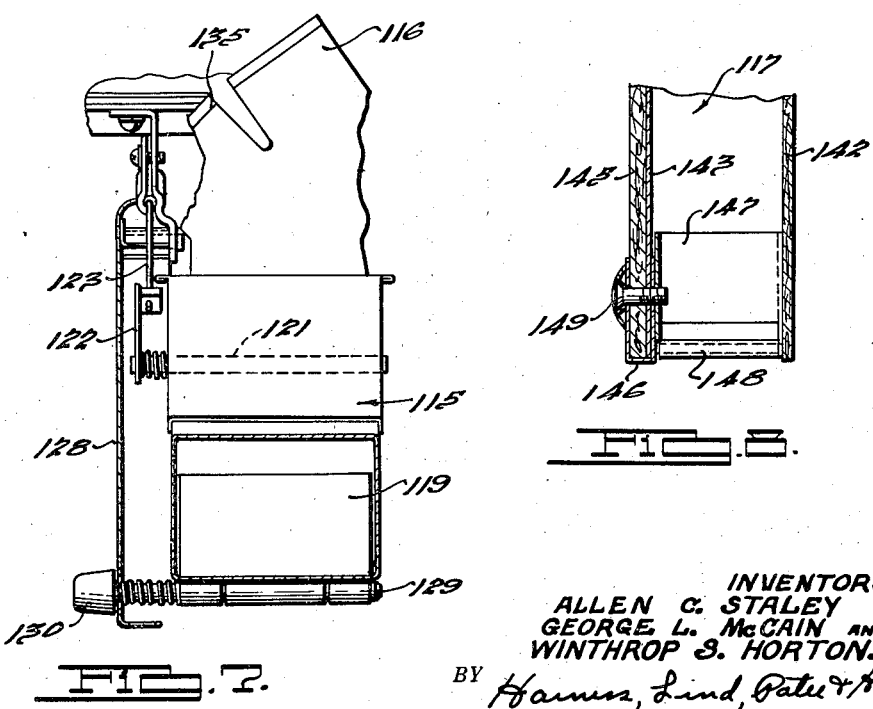
Fig. 6 is a section in elevation taken substantially along line 6—6 of Fig. 5 and looking in the direction of the arrows.
Fig. 7 is a vertical section taken substantially along line 7—7 of Fig. 4 and looking in the direction of the arrows; and, Fig. 8 is a horizontal section taken substantially along line 8—8 of Fig. 4 and looking in the direction of the arrows.

Suitably located within the blower chamber 106 is a blower housing 110 of the scroll type within which is a blower wheel 111 mounted upon the shaft 112 of a motor 113 fixed to and extending from the surface of the blower chamber, the motor shaft 112 extending through the wall of the blower chamber. The outlet of the blower housing 110 extends toward the side of the car and downwardly at an angle toward the lower portion of the driver's compartment, there being an opening in the wall of the blower chamber so that the heated air ejected by the blower may pass through the opening into a plenum chamber 115, from which extends a small, vertical riser duct 116 which supplies streams of heated air to the vicinity of the windshield for defrosting purposes. The lower end of the plenum chamber is adapted to receive and support the open end of an outlet duct 117 through which heated air is admitted to the occupied portion of the automobile, and the plenum chamber is provided with a pair of dampers 118 and 119, the former being positioned adjacent the inlet to the riser duct 116, and the latter being positioned adjacent an opening 120 in the lower wall of the plenum chamber. The damper 118 is fixed to a shaft 121 which extends forward through the wall of the plenum chamber, the outer end of which is fixed to a damper lever 122. The free end of the lever 122 is provided with means for attaching the end of a Bowden cable 123 extending to an operating button 124 guided in a control block 125 conveniently located on the instrument panel beneath the instrument displaying portion thereof, and adjacent the levers 60 and 77. Pulling outward on the knob 124 rocks lever 122 counterclockwise (Fig. 4) and opens the damper 118 to the position shown in skeleton outline in Fig. 6 from the position shown in cross-section in Fig. 6, and vice versa. The plenum chamber 115 and the lever 122 are located behind an ornamental panel 128 extending from the blower chamber 106 and the rock shaft 129 for the damper 119 extends through the panel 128 and is fastened to an operating handle 130 by means of which the position of damper 119 may be controlled. As shown in Fig. 6, dampers 118 and 119 have a range of movement from positions such that the openings adjacent thereto may be fully opened to positions such that the openings may be fully closed, so that all of the hot air from the coil 101 may be distributed through the defrosting passages or through the outlet duct 117, or a part of the air may be admitted to each.

The riser 116 is preferably provided with an elbow connection 135 by means of which the air admitted thereto may be divided so as to cause air to pass through a plurality of distributing ducts, the open end of the riser 116 being connected to a flexible hose 136 leading to the vicinity of the right side of the windshield, and the elbow 135 being connected to a flexible hose 137 leading to the left side of the windshield. The hoses 136 and 137 terminate in diffuser outlets 138 and 139, respectively, which are adapted to spread fan-shaped streams of air across the inner surface of the windshield, the diffusers being conveniently mounted beneath the windshield, and the instrument panel and windshield frame being suitably formed to support the diffusers and permit the passage of air therefrom. It is obvious that the plenum chamber for the left-hand heater mechanism need not be so supplied with the outlet and damper for the vertical riser since the one heater will supply all air needed for defrosting purposes, but the left-hand heater is preferably supplied with a damper 119 and operating handle 130 for the purpose of admitting heated air to the driver's compartment, such air being directed downwardly toward the feet of the driver in any desired volume.

The outlet duct 117 may be formed of any convenient sheet material, such as sheet metal, molded paper, molded fibrous materials, resin impregnated fibrous materials, and the like, a preferred embodiment being made of pressed paper or molded pulp of sufficient rigidity to maintain its shape against reasonable pressure. The duct 117 is provided with a neck portion 140 adapted to fit into the outlet of the plenum chamber 115, the neck portion extending laterally and upwardly from a diffuser portion 141, the outer wall 142 of which is molded to fit the contour of the lower, inner surface of the cowl 25, and the inner wall 143 of which is curved outwardly to form a longitudinally spreading outlet of narrow, lateral dimension from which the air emerges in a fan-shaped stream. The outer wall 142 is adapted to fit against the wall of the driver's compartment with the mouth of the outlet tube extending vertically along the rear edge of the cowl 25, adjacent the forward edge of the front door. The narrow width of the outlet duct makes it possible to apply the heating mechanism without altering the attractive appearance of the driver's compartment, since the duct may be installed by simply raising the felted kick-pad 145 with which the inner surface of the cowl 25 is lined, removing a portion thereof to permit the neck 140 to extend therethrough and then reapplying the kick-pad so as to cover the diffuser portion 141 of the outlet duct. The duct mouth is preferably reinforced by applying a grill thereto consisting of a U-shaped edge strip 146 which is adapted to receive the end edge of wall 143 and the end edge of the kick-pad 145, and a zigzag reinforcing strip 147, the horizontal steps of which act as directing members to direct the air in any direction desired. As seen in Fig. 3, the horizontal steps of the reinforcing member are substantially parallel and horizontal, but the inner extremities thereof may be bent at various angles in order to deflect the air upwardly or downwardly as desired. Preferably the outer edge of each horizontal step is ornamented by attaching thereto a bead strip 148. The reinforcing strip 147, the U-shaped strip 146, the wall 143, and the kick-pad 145 may be attached together by means of ornamental screws 149.

In the use of the present invention a wide variety of conditions may be met as follows: During cold, clear weather, the ventilating cowl 25 may be raised to any desired extent and the recirculating door 75 closed whereby fresh air only is drawn through the heating mechanism and distributed through the car, the blower 111 operating to create an internal pressure whereby vitiated air is forced outward through cracks or through lowered windows. If the temperature is so low as to practically prohibit the introduction of much fresh air, the ventilator 45 may be partially or fully closed and the recirculating door 75 opened so that practically all, or all, recirculated air may be drawn through the heating mechanisms. If it is desired to have fresh air admitted to the automobile without operating the blowers, the admission thereof may be accomplished by opening both the ventilating cowl 25 and the recirculating door 75 which thereupon acts as an admission door for fresh air forced into the intake compartment 47 by movement of the vehicle. For summer operation the admission of heating fluid from the motor 26 may be prohibited by valves (not shown) in the inlet conduits and the air within the automobile may be kept fresh and clean by operating the blowers and causing air to be drawn through the compartment 47 and through the filters 85 and 86, the filters being so arranged as to separate any drops of water which may be entrained with the air. Obviously, if a cooling medium were circulated through the coils 101, the air drawn thereover may be fresh air or recirculated air or a combination of both.

The system is designed principally for the heating of air in cold weather and achieves this object in a manner which is efficient and highly pleasing to the occupants of the automobile, since the outlet duct is so arranged as to direct a wall or blanket of the hottest air adjacent the interior surface of the side of the automobile, the front seat 23 being preferably narrower than the width of the tonneau in order to leave spaces 150 and 151 adjacent the ends thereof through which the wall of air at each side moves into the rear compartment. The velocity of the air is expended in the rear compartment and the warm air rises within the rear compartment to be drawn forward into the recirculated air door 75 or to be gradually dissipated through cracks and lowered windows, so that the air which reaches the breathing level is mildly tempered by admixture with cooler air within the automobile.

Having described a preferred embodiment of the present invention, it should be apparent to those skilled in the art that the same permits of modifications in arrangement and detail. All such as come within the scope of the following claims are considered a part of the invention.

We claim:

1. In an automobile the combination of means for altering the temperature of a stream of air, means for causing a stream of air to pass through said first means to have its temperature altered, and an outlet distributor for said second means comprising a duct having one end adapted to be connected to said second means and a diffuser portion arranged to lie against the lower portion of the side wall of the automobile having an outlet to the interior of said automobile open when the door to the driver's compartment is closed at a location adjacent the front edge of said door, said duct being flared toward its outlet end so as to direct a moving wall of tempered air rearwardly through space across the lower portion of the side wall of the automobile, and said duct having directional vanes within the outlet end thereof.

2. In combination with an automobile having an air tempering attachment located within the driver's compartment beneath the top wall of the cowl, an outlet duct for said air tempering means shaped to conform to the side wall of the cowl, and a decorative cowl lining member arranged to cover said outlet duct, said duct having an outlet open directly to the driver's compartment when the door to the latter is closed and being arranged adjacent the front edge of said door, the outlet end portion of said duct being vertically flared whereby to direct a wall of tempered air through space across the side wall of the vehicle including said door.

3. In combination with an automobile having an air tempering attachment located within the driver's compartment beneath the top wall of the cowl, an outlet duct for said air tempering means shaped to conform to the side wall of the cowl, and a decorative cowl lining member arranged to cover said outlet duct, said outlet duct having an open end communicating with said compartment when the door to the latter is closed and being arranged adjacent the front edge of the door to the driver's compartment, the open end portion of said duct being vertically flared whereby to direct a wall of tempered air through space across the side wall of the vehicle, and decorative edge trimming adapted to attach the edge of said cowl lining member to the edge of the open end of said outlet duct.

ALLEN C. STALEY.
GEORGE L. McCAIN.
WINTHROP S. HORTON.